United States Patent
Tetelbaum et al.

(10) Patent No.: US 8,473,890 B2
(45) Date of Patent: Jun. 25, 2013

(54) TIMING ERROR SAMPLING GENERATOR AND A METHOD OF TIMING TESTING

(75) Inventors: Alexander Tetelbaum, Hayward, CA (US); Sreejit Chakravarty, Mountain View, CA (US)

(73) Assignee: LSI Corporation, Milpitas, AA (US)

( * ) Notice: Subject to any disclaimer, the term of this patent is extended or adjusted under 35 U.S.C. 154(b) by 0 days.

(21) Appl. No.: 13/460,605

(22) Filed: Apr. 30, 2012

(65) Prior Publication Data

US 2012/0278780 A1     Nov. 1, 2012

Related U.S. Application Data

(62) Division of application No. 12/334,403, filed on Dec. 12, 2008, now Pat. No. 8,191,029.

(51) Int. Cl.
*G06F 11/22* (2006.01)
*G06F 17/50* (2006.01)

(52) U.S. Cl.
USPC ........... 716/136; 716/108; 716/111; 716/112; 716/113

(58) Field of Classification Search
USPC ............. 716/108, 111, 112, 113, 136
See application file for complete search history.

(56) References Cited

U.S. PATENT DOCUMENTS

| | | | |
|---|---|---|---|
| 7,138,829 B1 | 11/2006 | Dalvi | |
| 7,944,319 B2 | 5/2011 | Kerr et al. | |
| 2004/0251944 A1* | 12/2004 | Ma ................. | 327/198 |
| 2007/0124634 A1* | 5/2007 | Shibuya .......... | 714/731 |
| 2007/0162798 A1* | 7/2007 | Das et al. ....... | 714/724 |
| 2007/0164787 A1* | 7/2007 | Grochowski et al. ........... | 326/46 |
| 2009/0195287 A1* | 8/2009 | Ho et al. ....... | 327/298 |
| 2009/0278576 A1 | 11/2009 | Chakravarty | |
| 2010/0153895 A1 | 6/2010 | Tetelbaum et al. | |

OTHER PUBLICATIONS

Wakerly, John F.; Digital Design Principles & Practices; Third Edition Updated; Cisco Systems, Inc. Stanford University; 2001, 2000, 1994, 1990 Prentice Hall, Upper Saddle River, New Jersey; 5 pages.

* cited by examiner

*Primary Examiner* — Nha Nguyen (57) ABSTRACT

A timing error sampling generator, a method of performing timing tests and a library of cells are provided. In one embodiment, the timing error sampling generator includes: (1) a hold delay element having an input and an output and configured to provide a hold violation delayed signal at said output by providing a first predetermined delay to a clock signal received at said input, said first predetermined delay corresponding to a hold violation time for a path to be monitored and (2) a hold logic element having a first input coupled to said input of said hold delay element, a second input coupled to said output of said hold delay element and an output at which said hold logic element is configured to respond to said first and second inputs to provide a clock hold signal when logic levels at said first and second inputs are at a same level.

14 Claims, 5 Drawing Sheets

FIG. 5

TIMING ERROR SAMPLING GENERATOR AND A METHOD OF TIMING TESTING

CROSS REFERENCE TO RELATED APPLICATION

This application is a divisional of U.S. patent application Ser. No. 12/334,403 entitled "TIMING ERROR SAMPLING GENERATOR, CRITICAL PATH MONITOR FOR HOLD AND SETUP VIOLATIONS OF AN INTEGRATED CIRCUIT AND A METHOD OF TIMING TESTING" filed on Dec. 12, 2008 now U.S. Pat. No. 8,191,029, which is currently pending. The above-listed application is commonly assigned with the present application and is incorporated herein by reference as if reproduced herein in its entirety.

TECHNICAL FIELD

This application is directed, in general, to integrated circuits (ICs) and, more specifically, to a path monitor for an IC and a method of testing an IC.

BACKGROUND

When signals do not propagate through a circuit as needed, timing violations are created. To determine if timing problems exist with a particular IC, timing tests may be performed by manufacturers during chip testing. One example of a timing test is at-speed testing. At-speed testing can assist in determining timing violations for particular paths, such as critical paths, of an IC by applying a test pattern and capturing the response of the test pattern after propagating along a path. For at-speed testing, the test pattern can be a scan pattern or a functional pattern. To prevent timing violations in chips, improved timing tests would be beneficial.

SUMMARY

One aspect provides a timing error sampling generator for determining timing violations of monitored paths. In one embodiment, the timing error sampling generator includes: (1) a hold delay element having an input and an output and configured to provide a hold violation delayed signal at the output by providing a first predetermined delay to a clock signal received at the input, the first predetermined delay corresponding to a hold violation time for a path to be monitored and (2) a hold logic element having a first input coupled to the input of the hold delay element, a second input coupled to the output of the hold delay element and an output at which the hold logic element is configured to respond to the first and second inputs to provide a clock hold signal when logic levels at the first and second inputs are at a same level.

Another aspect provides a method of performing a timing test on a path. In one embodiment, the method includes: (1) generating a comparison signal based on a data signal from the path and a clocked data signal, (2) generating a clock hold signal employing first logic circuitry and a hold delay element that provides a first predetermined delay corresponding to a hold violation time for the path and (3) providing an error hold signal based on the comparison signal and the clock hold signal to indicate a hold violation of the path.

In still another aspect, a library of standard logic elements is provided. In one embodiment, the library includes a standard logic element corresponding to a timing error sampling generator.

BRIEF DESCRIPTION

Reference is now made to the following descriptions taken in conjunction with the accompanying drawings, in which.

DETAILED DESCRIPTION

Disclosed herein are path monitors couplable to paths of an IC to detect timing violations of a specific path. Typically, the specific path is a critical (timing critical) path of the IC. As such, the path monitor will be a critical path monitor (CPM). The timing violations may be hold violations or setup violations. A setup violation occurs when a signal propagates too slowly through a critical path. A hold violation occurs when a signal propagates too quickly through the critical path. Timing setup violations or timing hold violations (also referred herein as setup violations and hold violations) frustrate the logic of an IC and prevent the IC from performing the job it was designed to do. As such, the CPMs are used to ensure the signal propagation speed along a critical path of an IC is operating as intended.

The CPMs can be used in timing test circuits to provide robust and effective timing test to detect setup and hold violations and the defects that cause at-speed failures. As such, the disclosed CPMs can be used for timing tests of ICs to catch timing violations during chip testing. As disclosed herein, the CPMs can also be used during native mode of operation.

The disclosed CPMs provide error signals indicating a timing violation. In one embodiment discussed herein, a CPM is provided that detects only hold violations during testing or native mode of operation. Additionally, a hybrid CPM design is disclosed that can detect both hold and setup violations during testing or native mode of operation. Thus, the hybrid CPM design can distinguish between hold violations and setup violations. The disclosed CPMs, therefore, can be used to identify if timing errors have occurred, determine the type of timing violation, a setup violation or a hold violation, and allow the timing violation to be caught during chip testing to allow corrections.

The CPMs can be used for at-speed testing in conjunction with scan patterns or functional patterns. When used during the native mode of operation, the CPMs can be used for power optimization where the voltage or frequency is adjusted to save power. In other words, IC components are run at an optimal voltage to minimize power while there are no errors, (i.e., setup and hold violations). If an error is detected by a CPM, then the voltages/frequencies can be corrected to eliminate the error.

Also disclosed herein are circuits, referred to as a timing error sampling generator, for generating clock hold signals and setup hold signals for the disclosed CPMs. The clock hold and setup signals correspond to hold violations and setup violations, respectively, of a circuit with respect to the clock speed of the circuit.

Figure 1:
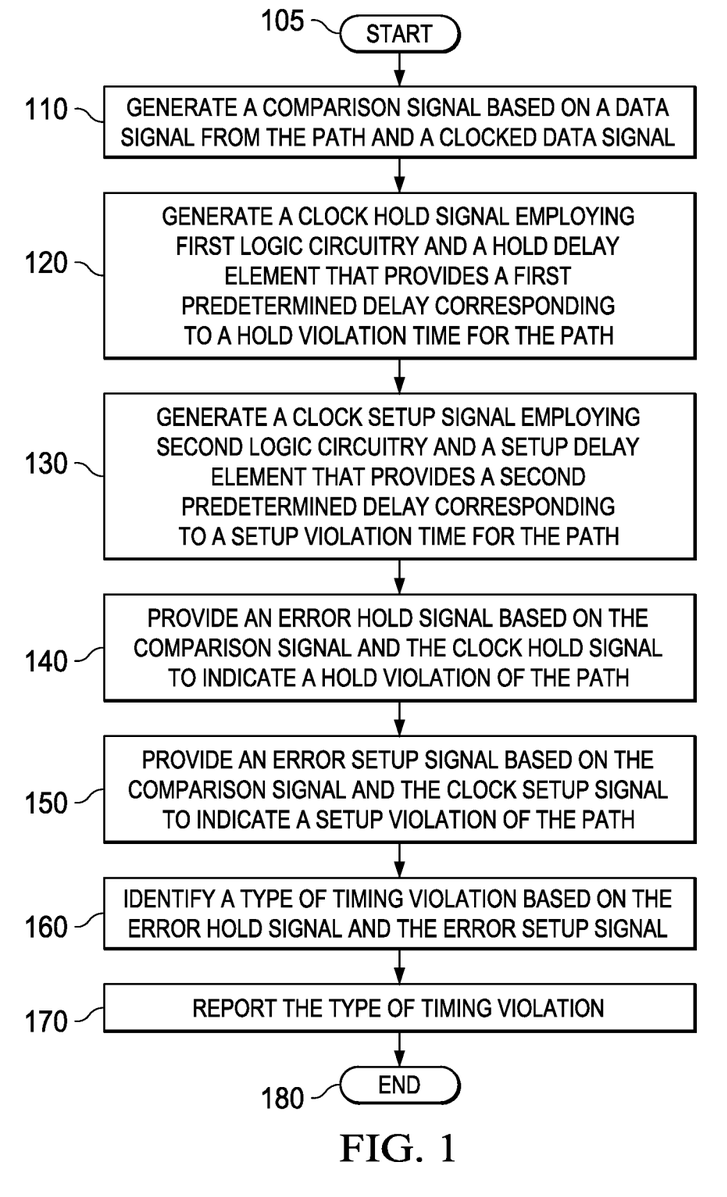
FIG. 1 is a flow diagram of one embodiment of a method of performing a timing test on a path carried out according to the principles of the invention.

FIG. 1 is a flow diagram of one embodiment of a method of performing a timing test on a critical path of an IC carried out according to the principles of the invention. Automated Test Equipment (ATE) may be coupled to the IC to drive a scan clock to shift test data into scan chains of the IC from the ATE and provide a scan pattern for testing of the critical path. The scan pattern may include data and a clock signal. The method 100 may employ CPMs as disclosed in FIG. 2 or 3. The CPMs may employ a timing error sampling generator as disclosed in FIG. 4. Additionally, the testing may be performed on an IC such as the IC disclosed in FIG. 5. The method 100 begins in a step 105.

In a step 110, a comparison signal is generated based on a data signal from the critical path and a clocked data signal. Comparison circuitry, such as an exclusive NOR gate, may be employed to generate the comparison signal. A scan pattern may be used to generate the data signal and the clock signal. A clock hold signal is generated in a step 520 employing first logic circuitry and a hold delay element that provides a first predetermined delay corresponding to a hold violation time for the critical path. The first logic circuitry may be a AND gate.

Additionally, a clock setup signal is generated in a step 130 employing second logic circuitry and a setup delay element that provides a second predetermined delay corresponding to a setup violation time for the path. The second logic circuitry may be a AND gate.

An error hold signal is provided in a step 140 based on the comparison signal and the clock hold signal to indicate a hold violation of the path. An AND gate may be used to generate the error hold signal. In one embodiment, the error hold signal is provided when the comparison signal and the clock hold signal are at a high logic level. In one embodiment the error hold signal may be provided only when the comparison signal and the clock hold signal are at the same logic level.

In a step 150, an error setup signal is provided based on the comparison signal and the clock setup signal to indicate a setup violation of the path. An AND gate may be used to generate the error hold signal. In one embodiment, the error setup signal is provided when the comparison signal and the clock setup signal are at a high logic level. In some embodiments, the error setup signal may be provided only when the comparison signal and the clock setup signal are at the same logic level.

Additionally, only a single logic element may be employed when providing the clock hold signal. Similarly, only a single logic element may be employed when providing the clock setup signal. As noted above, each of the single logic elements may be an AND gate.

Based on the error hold signal and the error setup signal, a type of timing violation can be identified in a step 160. The type of timing violation can be provided as an output in a step 170. The type of timing violation can be provided to the ATE for a designer to review. With this knowledge, alterations can be made to the IC to correct the timing violation. The method 100 then ends in a step 180.

Figure 2:
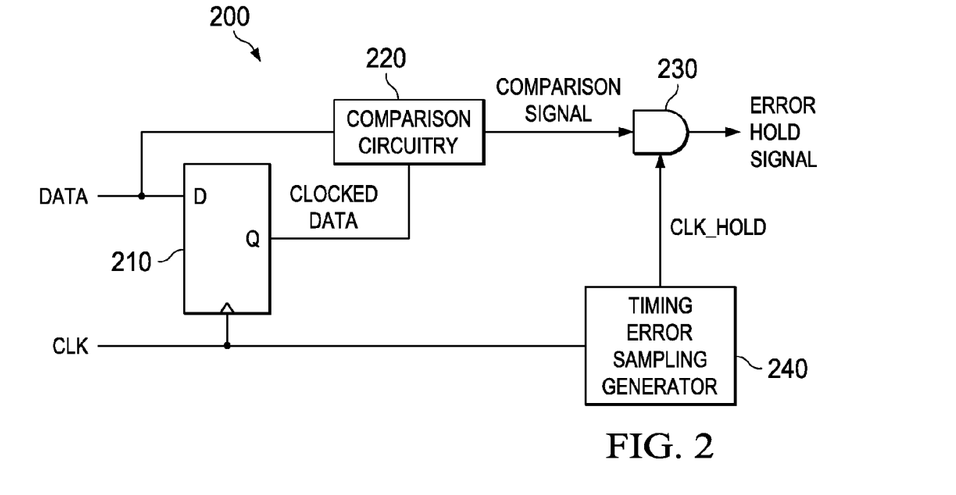
FIG. 2 is a logic-level schematic diagram of one embodiment of a path monitor constructed according to the principles of the invention.

FIG. 2 is a logic-level schematic diagram of one embodiment of a critical path monitor 200 constructed according to the principles of the invention. The critical path monitor 200 is configured to monitor a critical path and provide an error hold signal if a hold violation is detected thereon. The critical path monitor 200 may be employed by the method 100 and in the IC 500 of FIG. 5. The critical path monitor 200 includes a DQ flip-flop 210, first logic circuitry 220, second logic circuitry 230 and a timing error sampling generator 240. The first and second logic circuitry 220, 230, may be logic gates. For example, the first logic circuitry 220 may be comparison circuitry, such as an exclusive NOR gate, and the second logic 230 may be an AND gate. As such, hereinafter the first logic circuitry 220 and the second logic circuitry 230 will be referred to as a comparison circuitry 220 and an AND gate 230.

The DQ flip-flop 210 is a clocked flip-flop having a D input that receives data from the critical path being monitored and a clocked input that receives a clock signal to drive the DQ flip-flop 210. The DQ flip-flop 210 also includes a Q output that provides 'clocked data signal' based on the received data and a transition of the clock signal.

The comparison circuitry 220 has a first input, a second input and an output. The first input of the comparison circuitry 220 is coupled to the D input of the DQ flip-flop 210 and the second input is coupled to the Q output of the DQ flip-flop 210. Like the D input of the DQ flip-flop 210, the first input of the comparison circuitry 220 receives the data from the critical path being monitored. At the second input, the comparison circuitry 220 receives the clocked data signal from the Q output after the DQ flip-flop 210 has been triggered. The output of the comparison circuitry 220 is configured to provide a 'comparison signal' based on the data signal and the clocked data signal. In the illustrated embodiment, the comparison signal is a low logic level signal when both the data signal and the clocked data signal are at a high logic level. In the illustrated embodiment, the comparison circuitry 220 is an unclocked logic element that produces an asynchronous comparison signal.

The AND gate 230 is also an unclocked logic element. The AND gate 230 is configured to produce an error signal based on the comparison signal and a clock hold signal generated by the timing error sampling generator 240. The clock hold signal can be used to mark the interval during which the comparison signal is signaled. The AND gate 230 includes a first input, a second input and an output. The first input of the AND gate 230 is coupled to the output of the comparison circuitry 220 and receives the comparison signal therefrom. The second input of the AND gate 230 is coupled to the timing error sampling generator 240 and receives the clock hold signal therefrom. The output of the AND gate 230 is configured to respond to the comparison signal and the clock hold signal and provide an error hold signal when both the comparison signal and the clock hold signal are at the same logic level (which is a high logic level in the illustrated embodiment). As such, the AND gate 230 can be considered a timing violation signal generator. The error hold signal can be provided as an output during chip testing to allow for modifications to the path or IC to correct the hold violation or to mark the path. The error hold signal can also be provided to a voltage management unit (VMU) via error logic circuitry as illustrated in and discussed with respect to FIG. 5. In the critical path monitor 200, the error hold signal is an asynchronous signal that indicates a hold violation.

The timing error sampling generator 240 is configured to provide the clock hold signal. The clock hold signal represents the amount of hold time needed to prevent a timing hold violation in the critical path being monitored. The timing error sampling generator 240 is a clocked circuit that employs the same clock as the DQ flip-flop 210. The clock may be a clock of the IC. The timing error sampling generator 240 includes a clock input that receives the clock signal and an output that provides the clock hold signal to the second input of the AND gate 230. The timing error sampling generator 240 may be the circuit illustrated in FIG. 4.

Figure 2A:
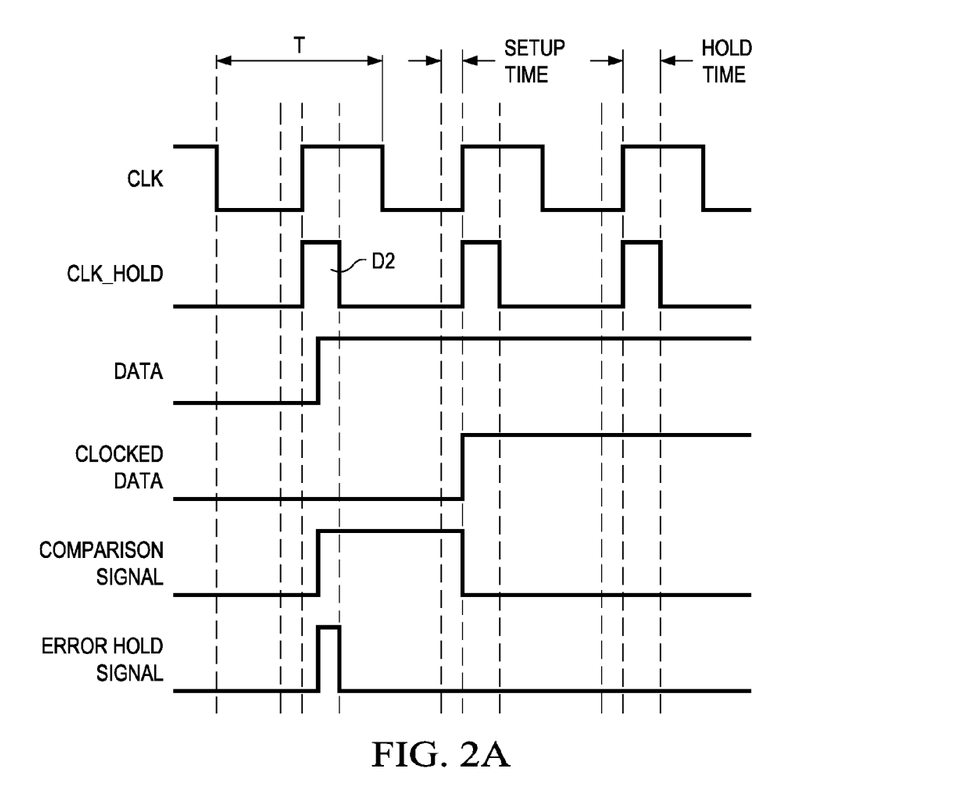
FIG. 2A is a timing diagram representing the propagation of signals through the path monitor illustrated in FIG. 2.
Figure 4:
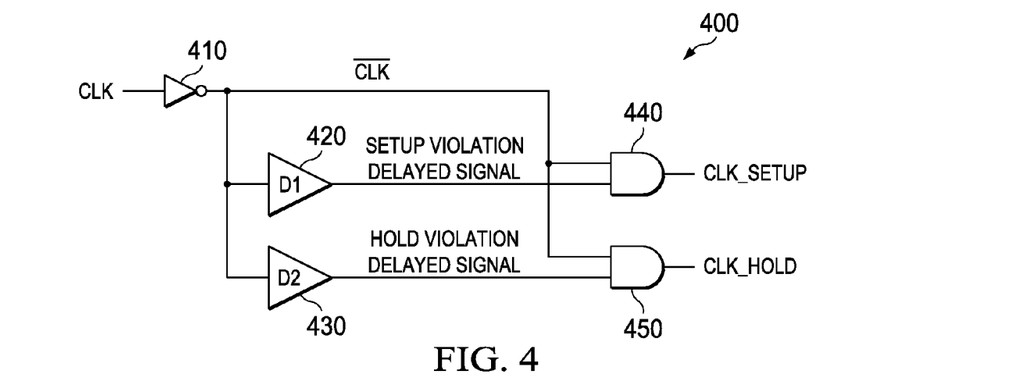
FIG. 4 is a logic-level schematic diagram of one embodiment of a timing error sampling generator constructed according to the principles of the invention.

FIG. 2A is a timing diagram representing the propagation of signals through the critical path monitor 200 illustrated in FIG. 2. The clock signal is on the top line of the timing diagram. Each of the other lines represents signals identified in FIG. 2. D2, as noted in the second line, corresponds to the hold time used to generate the clock hold signal when a timing error sampling generator as in FIG. 4 is employed.

Figure 3:
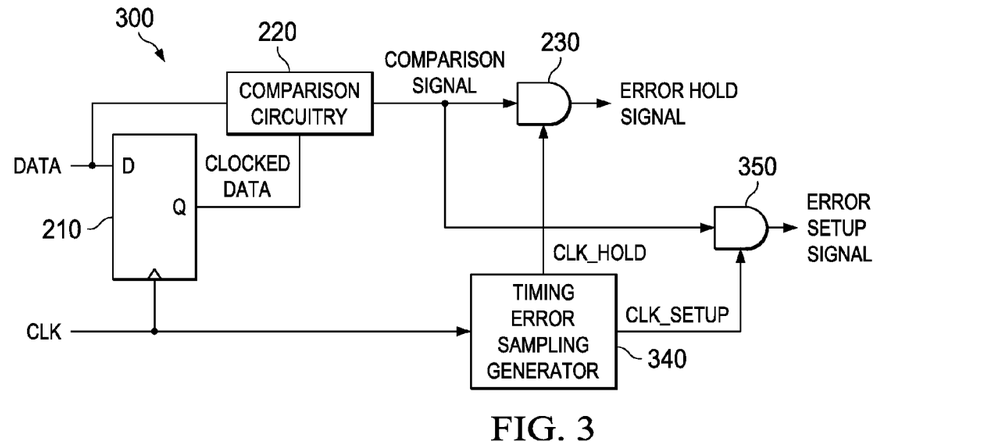
FIG. 3 is a logic-level schematic diagram of another embodiment of a path monitor constructed according to the principles of the invention.

FIG. 3 is a logic-level schematic diagram of another embodiment of a critical path monitor 300 constructed according to the principles of the invention. As with the critical path monitor 200, the critical path monitor 300 is configured to monitor a critical path and provide an error hold signal if a hold violation is detected. Additionally, the critical path monitor 300 is configured to monitor the critical path for a setup violation and provide an error setup signal if such a violation is detected. The critical path monitor 300 may be employed by the method 100. Additionally, the critical path monitor 300 may be employed in the IC 500 of FIG. 5. The critical path monitor 300 also includes the DQ flip-flop 210, the comparison circuitry 220 and the AND gate 230. Each of these components are configured and operate as discussed above with respect to the critical path monitor 200 in FIG. 2.

The critical path monitor 300 further includes a timing error sampling generator 340. In addition to providing a clock hold signal as provided by the timing error sampling generator 240 of FIG. 2, the timing error sampling generator 340 is also configured to provide a clock setup signal. The clock setup signal represents the amount of setup time needed to prevent a timing setup violation in the path being monitored. The timing error sampling generator 340 is a clocked circuit that employs the same clock as the DQ flip-flop 210. The timing error sampling generator 340 includes a clock input that receives the clock signal and a first output that provides the clock hold signal to the second input of the AND gate 230. Additionally, the timing error sampling generator 340 includes a second output that provides the clock setup signal to the second input of the AND gate 350. The timing error sampling generator 340 may be the circuit illustrated in FIG. 4 that generates both a clock hold signal and a clock setup signal.

Unlike the critical path monitor 200, the critical path monitor 300 also includes third logic circuitry 350 configured to respond to the comparison signal and the clock setup signal to provide an error setup signal. Like the AND gate 230, the AND gate 350 may also be referred to as a timing violation signal generator. The third logic circuitry 350 may be an AND gate. As such, the third logic circuitry 350 will be referred to herein as the AND gate 350.

The AND gate 350 is an unclocked logic element in the illustrated embodiment. The AND gate 350 is configured to produce an error setup signal based on the comparison signal from the output of the comparison circuitry 220 and the clock setup signal provided by the second output of the timing error sampling generator 350. The AND gate 350 includes a first input, a second input and an output. The first input is coupled to the output of the comparison circuitry 220 and receives the comparison signal therefrom. The second input is coupled to the timing error sampling generator 340 and receives the clock setup signal therefrom. The output of the AND gate 350 is configured to respond to the comparison signal and the clock setup signal and provide an error setup signal when both the comparison signal and the clock hold signal are at the same logic level (which is a high logic level in the illustrated embodiment). The error signal can be provided as an output during chip testing. The error signal can also be provided to a VMU via error logic circuitry as illustrated in and discussed with respect to FIG. 5. In the critical path monitor 300, both the error hold signal and the error setup signal are asynchronous signals.

FIG. 4 is a logic-level schematic diagram of one embodiment of a timing error sampling generator 400 constructed according to the principles of the invention. The timing error sampling generator 400 is configured to produce both a clock hold signal and a clock setup signal. Depending on the need, however, the timing error sampling generator 400 may generate only one of the clock hold or clock setup signals. Accordingly, the timing error sampling generator 400 may be trimmed to only produce the signal desired. In one embodiment, a library of standard logic elements includes the timing error sampling generator 400.

The timing error sampling generator 400 includes an inverter 410, a setup delay element 420, a hold delay element 430 and a setup logic element and a hold logic element represented by a setup AND gate 440 and a hold AND gate 450. The inverter 410 has an input and an output. The inverter 410 receives a clock signal at the input and provides an inverted clock signal at the output.

The setup delay element 420 is configured to provide a predetermined delay D1 that corresponds to a desired setup violation time for a particular path to be monitored. The setup delay element 420 has an input coupled to the output of the inverter 410 and an output coupled to a second input of the setup AND gate 440. The setup delay element 420 receives the inverted clock signal at its input and provides a setup violation delayed signal at its output.

The hold delay element 430 is configured to provide a predetermined delay D2 that corresponds to a desired hold violation time for a particular path to be monitored. The hold delay element 430 has an input coupled to the output of the inverter 410 and an output coupled to a second input of the hold AND gate 450. The hold delay element 430 receives the inverted clock signal at its input and provides a hold violation delayed signal at its output.

The setup AND gate 440 is configured to provide a clock setup signal that can be used to detect setup violations. The setup AND gate 440 includes a first input, a second input and an output. The first input of the setup AND gate 440 is coupled to the output of the inverter 410 and the second input is coupled to the output of the setup delay element 420. The output of the setup AND gate 440 responds to the inverted clock signal received at the first input and the setup violation delayed signal received at the second input to provide the clock setup signal. In the illustrated embodiment, the setup AND gate 440 will produce a clock setup signal at a high logic level when the inverted clock signal and the setup violation delayed signal are at a high logic level.

The hold AND gate 450 is configured to provide a clock hold signal that can be used to detect hold violations. The hold AND gate 450 includes a first input, a second input and an output. The first input of the hold AND gate 450 is coupled to the output of the inverter 410 and the second input is coupled to the output of the hold delay element 420. The output of the hold AND gate 450 responds to the inverted clock signal received at the first input and the hold violation delayed signal received at the second input to provide the clock hold signal. In the illustrated embodiment, the hold AND gate 450 will produce a clock hold signal at a high logic level when the inverted clock signal and the hold violation delayed signal are at a high logic level.

Figure 4A:
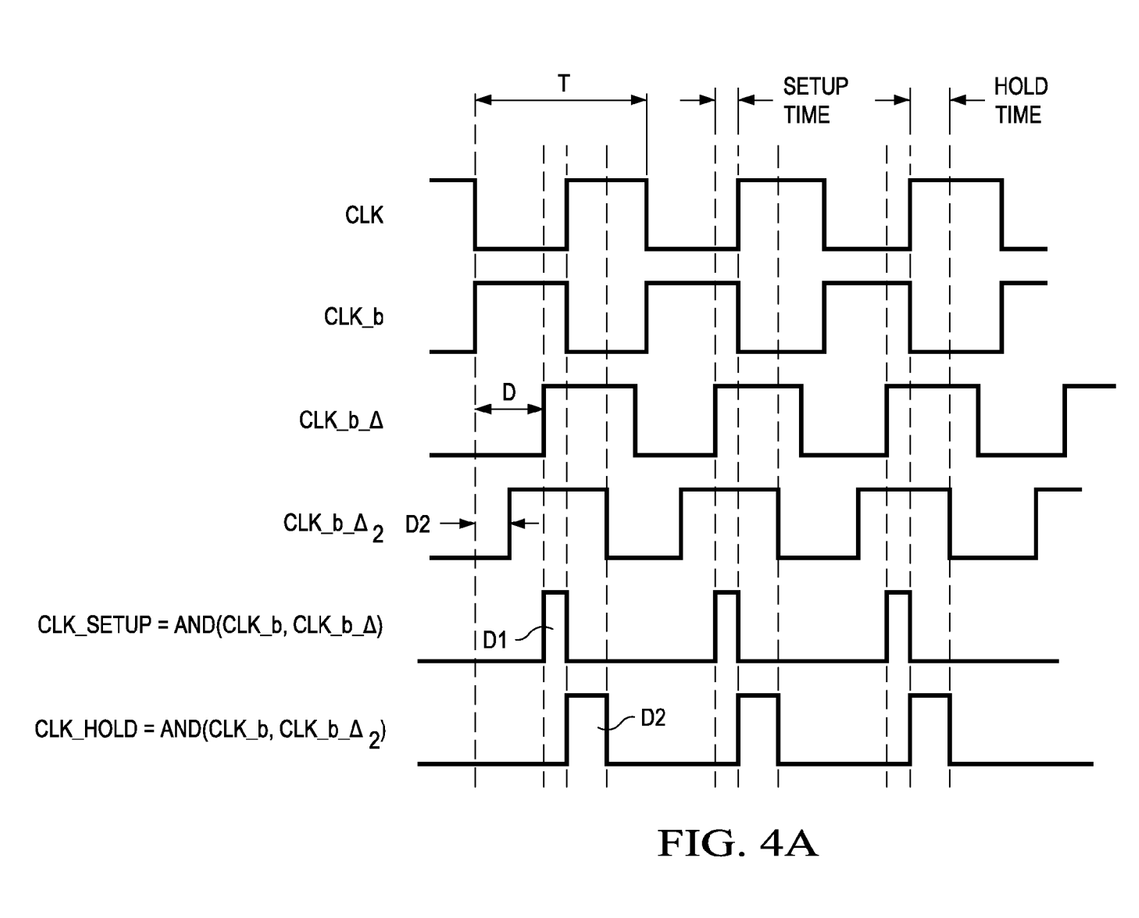
FIG. 4A is a timing diagram representing the propagation of signals through the timing error sampling generator illustrated in FIG. 4.

FIG. 4A is a timing diagram representing the propagation of signals through the timing error sampling generator 400 illustrated in FIG. 4. The clock signal is on the top line of the timing diagram. Each of the other lines represents signals identified in FIG. 4. D1 is a delay that corresponds to the setup violation time used to generate the clock setup signal. The delay D is equivalent to D1 subtracted from the clock period T, divided by 2 (i.e., D=T/2−D1). D2, as noted previously, corresponds to the hold violation time used to generate the clock hold signal.

Figure 5:
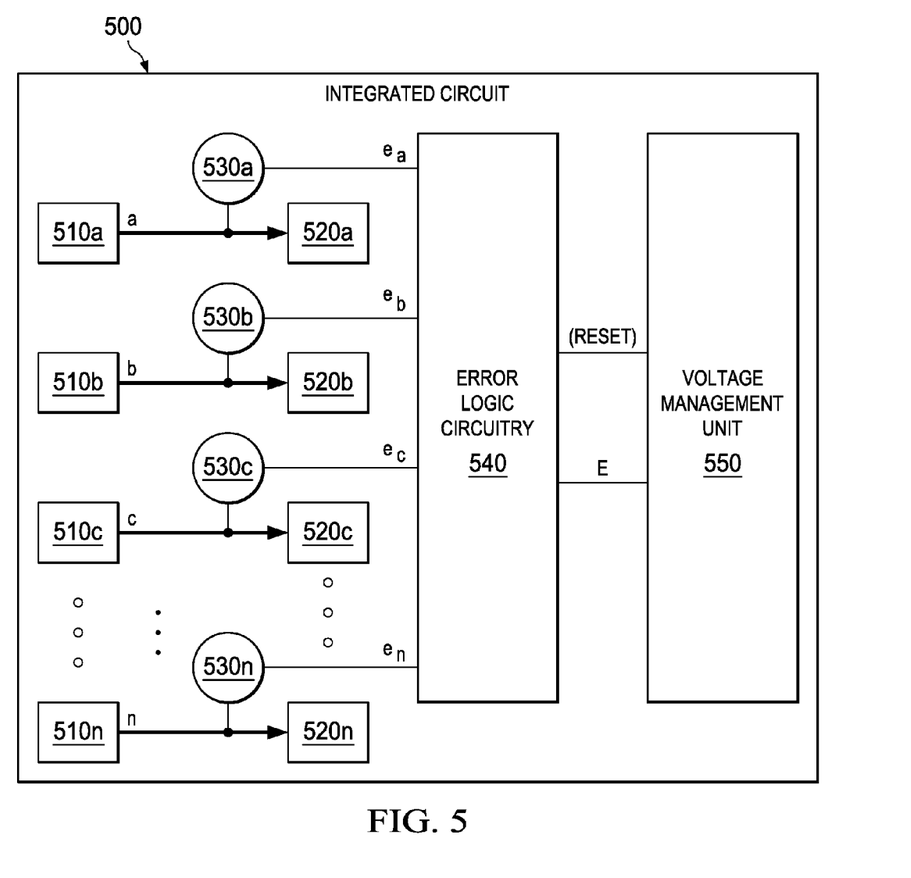
FIG. 5 is a block diagram of one embodiment of an IC within which a path monitor may be constructed or a method of monitoring a path may be carried out according to the principles of the invention.

FIG. 5 is a block diagram of one embodiment of an IC 500 within which a CPM may be constructed or a method of performing a voltage supply adjustment to avoid timing violations during IC functionality may be carried out according to the principles of the invention. The IC 500 is formed on or in (those two terms being defined herein as equivalent) a substrate (indicated by an unreferenced box surrounding the IC 500).

A plurality of paths is located on the substrate. FIG. 5 shows four such paths: a path a beginning at a gate 510a and ending at a gate 520a, a path b beginning at a gate 510b and ending at a gate 520b, a path c beginning at a gate 510c and ending at a gate 520c and a path n beginning at a gate 510n and ending at a gate 520n. In the illustrated embodiment, the paths a, b, c, n are critical paths in a particular clock domain in the IC 500. However, in alternative embodiments, the paths a, b, c, n lie in different clock domains, the paths a, b, c, n are not critical paths, and the IC 500 does not have separate clock domains or monitored paths in all clock domains.

A corresponding plurality of associated CPMs is also located on the substrate. In particular, a CPM 530a is associated with the path a, a CPM 530b is associated with the path b, a CPM 530c is associated with the path c, and a CPM 530n is associated with the path n. Each CPM 530a, 530b, 530c, 530n provides a corresponding error signal $e_a$, $e_b$, $e_c$, $e_n$. As discussed with respect to FIGS. 2 and 3, each of the corresponding error signals may indicate a hold violation or a setup violation depending on the configuration of the corresponding CPM.

Error logic circuitry 540 is located on the substrate and is coupled to each output of each of the plurality of the CPMs 530a, 530b, 530c, 530n. The error logic circuitry 540 is configured to indicate timing violations to a VMU 550 located on the substrate in response to the received error signals $e_a$, $e_b$, $e_c$, $e_n$. The error logic circuitry 540 may provide an overall error signal E to the VMU 550 based on the received error signals $e_a$, $e_b$, $e_c$, $e_n$. The error logic circuitry 540 may interact with the VMU 550 and include an unclocked (inclusive) OR gate and a DQ flip-flop as discussed in U.S. patent application Ser. No. 12/247,992, filed on Oct. 8, 2008, by Sreejit Chakravarty, entitled "CRITICAL PATH MONITOR FOR AN INTEGRATED CIRCUIT AND METHOD OF OPERATION THEREOF," which is incorporated herein by reference in its entirety. In some embodiments, the overall error signal E may reflect the type of timing violation, setup or hold, based on the received error signals $e_a$, $e_b$, $e_c$, $e_n$. As such, the error logic circuitry 540 may include two sets of an unclocked OR gate and a DQ flip-flop, one set to receive error hold signals and one set to receive error setup signals, to indicate to the VMU 550 the type of timing violation. The two sets may be in parallel to process the different timing violation indicators. Other logic configurations may be employed to indicate the type of timing errors to the VMU 550.

The VMU 550 is located on the substrate and is configured to receive the overall error signal E via the error logic circuitry 540 when an error is detected. The VMU 550 is configured to control one or more supply voltages associated with the one or more clock domains in the IC 500 based on the overall error signal E. The VMU 550 can also reset the overall error signal E by providing a reset signal to the error logic circuitry 540. The VMU 550 may increase or decrease the supply voltage based on if the overall error signal E indicates a hold violation or a setup violation. In addition to responding to setup and hold violations indicated by the error signals, the VMU 550 may also operate as the VMU described in Chakravarty which is incorporated herein. As such, the VMU 550 may be used for Adaptive Voltage Scaling (AVE) to monitor and control supply voltages of multiple clock domains in the IC 500. Therefore, the overall power consumption of the IC 500 is probably substantially less compared to if the supply voltages not to be so controlled.

Those skilled in the art to which this application relates will appreciate that other and further additions, deletions, substitutions and modifications may be made to the described embodiments.

What is claimed is:

1. A timing error sampling generator for determining timing violations of monitored paths, comprising:
a hold delay element having an input configured to receive a clock signal and an output and configured to provide a hold violation delayed signal at said output by providing a first predetermined delay to said clock signal received at said input, said first predetermined delay corresponding to a hold violation time for a path to be monitored;
a hold logic element having a first input coupled to said input of said hold delay element to receive said clock signal, a second input coupled to said output of said hold delay element and an output at which said hold logic element is configured to respond to said first and second inputs to provide a clock hold signal when logic levels at said first and second inputs are at a same level;
a setup delay element having an input configured to receive said clock signal and an output and configured to provide a setup violation delayed signal at said output by providing a second predetermined delay to said clock signal received at said input, said second predetermined delay corresponding to a setup violation time for said path to be monitored; and
a setup logic element having a first input coupled to said input of said setup delay element to receive said clock signal, a second input coupled to said output of said setup delay element and an output at which said setup logic element is configured to respond to said first and second inputs to provide a clock setup signal when logic levels at said first and second inputs of said setup logic element are at an equivalent level.

2. The timing error sampling generator as recited in claim 1 wherein said clock signal is an inverted clock signal and said timing error sampling generator further comprises an inverter configured to generate said inverted clock signal from an input clock signal.

3. The timing error sampling generator as recited in claim 1 wherein said same level is a high logic level.

4. The timing error sampling generator as recited in claim 1 wherein said equivalent level is a high logic level.

5. The timing error sampling generator as recited in claim 1 wherein said timing error sampling generator is employable in a path monitor configured to monitor said path.

6. The timing error sampling generator as recited in claim 1 wherein said path and said timing error sampling generator are embodied on a common substrate as part of an integrated circuit.

7. A method of performing a timing test on a path, comprising:
generating a comparison signal based on a data signal from said path and a clocked data signal;

generating a clock hold signal employing first logic circuitry and a hold delay element that provides a first predetermined delay corresponding to a hold violation time for said path;

providing an error hold signal based on said comparison signal and said clock hold signal to indicate a hold violation of said path;

generating a clock setup signal employing second logic circuitry and a setup delay element that provides a second predetermined delay corresponding to a setup violation time for said path; and providing an error setup signal based on said comparison signal and said clock setup signal to indicate a setup violation of said path.

8. The method as recited in claim 7 wherein said providing comprises providing said error hold signal when said comparison signal and said clock hold signal are at a high logic level.

9. The method as recited in claim 7 wherein said providing said error setup signal comprises providing said error setup signal when said comparison signal and said clock setup signal are at a high logic level.

10. The method as recited in claim 7 further comprising identifying a type of timing violation of said path based on said error hold signal and said error setup signal.

11. The method as recited in claim 10 further comprising indicating said type of timing violation to a voltage management unit.

12. The method as recited in claim 7 wherein said providing said clock hold signal and providing said clock setup signal each employ only a single logic element and each of said single logic element is an AND gate.

13. A library of standard logic elements stored on a non-transitory computer readable medium for designing an integrated circuit, said library comprising:

a standard logic element corresponding to a timing error sampling generator, including:

a hold delay element having an input configured to receive a clock signal and an output and configured to provide a hold violation delayed signal at said output by providing a first predetermined delay to said clock signal received at said input, said first predetermined delay corresponding to a hold violation time for a path to be monitored;

a hold logic element having a first input coupled to said input of said hold delay element to receive said clock signal, a second input coupled to said output of said hold delay element and an output at which said hold logic element is configured to respond to said first and second inputs to provide a clock hold signal when logic levels at said first and second inputs are at a same level;

a setup delay element having an input configured to receive said clock signal and an output and configured to provide a setup violation delayed signal at said output by providing a second predetermined delay to said clock signal received at said input, said second predetermined delay corresponding to a setup violation time for said path to be monitored; and a setup logic element having a first input coupled to said input of said setup delay element to receive said clock signal, a second input coupled to said output of said setup delay element and an output at which said setup logic element is configured to respond to said first and second inputs to provide a clock setup signal when logic levels at said first and second inputs of said setup logic element are at an equivalent level.

14. The library as recited in claim 13 further comprising another standard cell for a path monitor including said timing error sampling generator.

* * * * *